Aug. 18, 1936.  D. E. JOHNSON  2,051,086
NUT MAKING MACHINE
Filed June 3, 1935
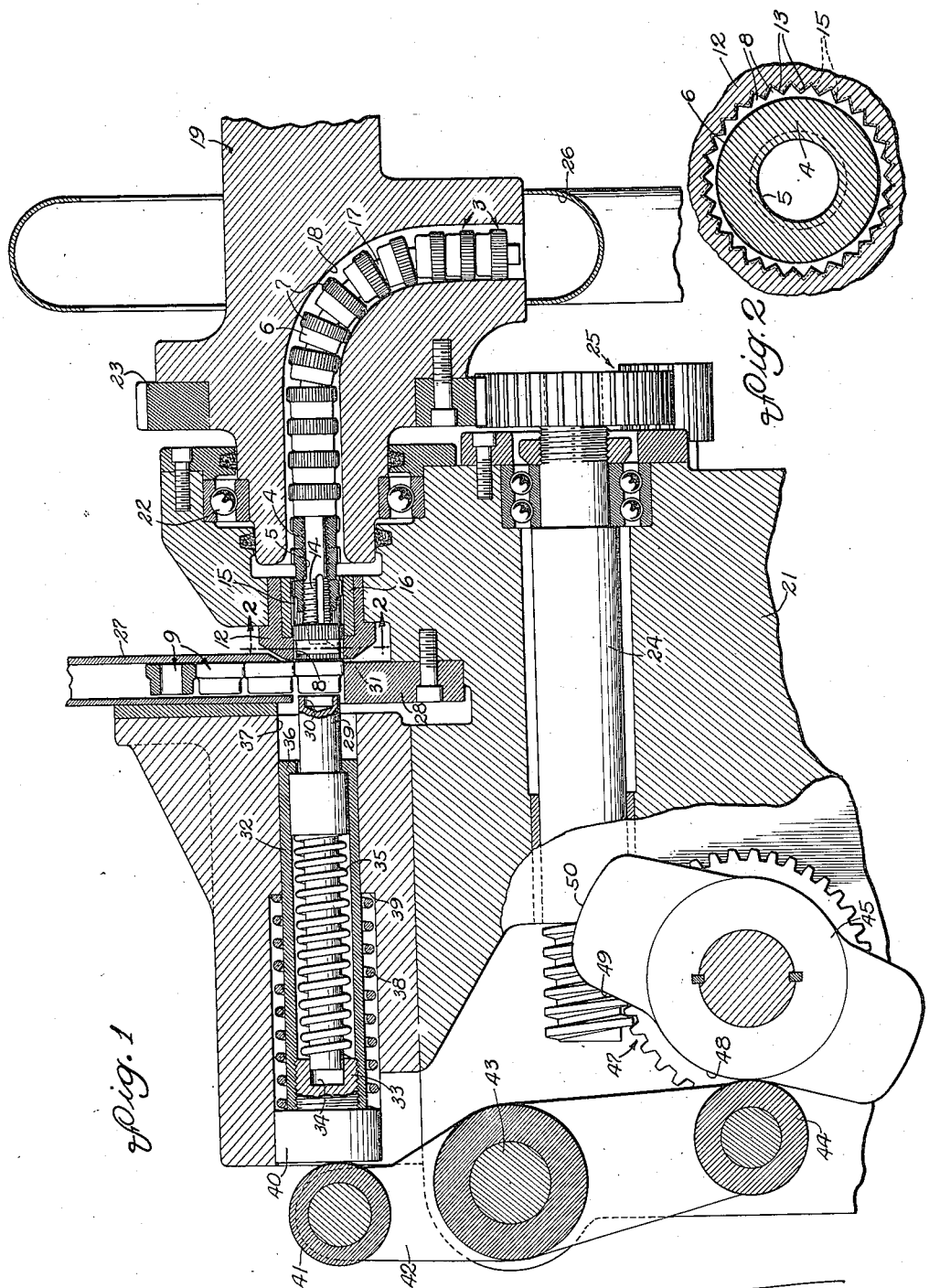

Patented Aug. 18, 1936

2,051,086

UNITED STATES PATENT OFFICE 2,051,086

NUT MAKING MACHINE

David E. Johnson, Rockford, Ill.

Application June 3, 1935, Serial No. 24,619

9 Claims. (Cl. 10—75)

This invention relates to the formation of nuts of the type which have fine peripheral teeth or serrations extending parallel to the nut axis and adapted to interfit with complemental serrations in the socket of a tool by which the nut may be gripped and turned onto a bolt or other threaded member.

The general object of the invention is to provide a novel apparatus by which nuts of the above character may be formed with a high degree of accuracy, at low manufacturing cost, and with a minimum amount of equipment and handling. In carrying out this object, the invention contemplates the performance of the serrating and tapping operations in succession in a single machine so as to avoid intermediate handling or positioning of the nut blanks.

A more detailed object is to provide novel apparatus of the above character in which the serrating and tapping operations are performed successively during a continuous advance of the nut blank axially through a serrating die and a serrated socket surrounding a rotating tapping tool and holding the nut against rotation during tapping thereof.

The invention also resides in the novel character of the mechanisms employed and the manner of handling the work blanks.

Other objects and advantages of the invention will become apparent from the following detailed description taken in connection with the accompanying drawing, in which Figure 1 is a fragmentary vertical sectional view of a nut making machine embodying the novel features of the present invention.

Fig. 2 is an enlarged section taken along the line 2—2 of Fig. 1.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the drawing, the invention is illustrated in connection with the formation of nuts 3 of the so-called fillister type comprising a body 4 having an internally threaded bore 5 and a smooth annular head 6 upstanding from a portion 7 of slightly larger diameter formed throughout its length with accurately cut fine serrations 8 preferably having flat sheared surfaces intersecting each other. Preparatory to the serrating and trimming operations, the nut blanks 9 are formed to the desired shape in an automatic screw machine or other suitable apparatus (not shown).

In accordance with the present invention, the nut blanks are advanced sidewise one by one into axial alinement with a die 12 having internal serrations 13 complemental in shape to the serrations to be formed on the nut blanks. Each blank is then forced axially to cut the serrations and move the nut into operative engagement with a rotating tapping tool 14 along which the nut is advanced to thread the internal bore thereof while being held against rotation by virtue of the interfitting relation of the serrations on the nut and complemental loosely fitting serrations 15 in a sleeve 16 surrounding the tapping tool.

The exemplary machine shown in the drawing is of the so-called continuous tapping type wherein the tapping tool 14 is rigid with one end of a curved rod 17 along which the finished nuts 3 are advanced through a similarly curved passageway 18 in a member 19 rotatably supported on the machine frame 21 through the medium of a bearing 22 and carrying a gear 23 by which the member 19 may be driven from a shaft 24 and appropriate speed reduction gearing 25. The end of the rod 17 opposite the tool 14 terminates adjacent the radially disposed end portion of the passageway 18 so that each successive finished nut which is forced off from the end of the rod will fall into or be thrown against a housing 26 and directed to a collecting receptacle (not shown).

In the present instance, the die 12 is of cylindrical form and removably mounted in the frame 21 with its axis in horizontal position. The sleeve 16 is mounted in the die body with its serrations accurately alined with the serrations 13 of the die and constructed to fit more loosely with the serrations on the nut so as to permit the latter to move freely through the sleeve under the action of the tool during threading.

To feed the nut blanks one by one into proper position for entering the die recess, the blanks are arranged side by side in a vertical tube or chute 27, the lower end of which terminates slightly above the die opening and opposite a block 28 which engages the enlarged base portion of the lowermost blank and is formed with a V-notch or other properly shaped recess for locating the lowermost nut blank in proper axial alinement with the die opening.

The positioned nut blank is removed from the stack and forced through the serrating die 12 into operative engagement with the threading tool by means of a plunger 29 which is mounted for longitudinal reciprocation through the space between the chute 27 and the positioning block 28 and into the open end of the die. The nut engaging end of the plunger is formed with a recess 30 into which the tapering end 31 of the tapping tool may enter in the most advanced position of the plunger.

The plunger is mounted in a manner such that a positive movement will be imparted to the nut blank to force the latter through the trimming die after which the blank is forced into active engagement with the tapping tool under spring action so as to avoid the danger of damaging the tapping tool. To this end, the plunger is formed intermediate its ends with an enlargement 31 slidable in a sleeve 32 which also supports an axially adjustable threaded plug 33 having a recess 34 in which the end of the plunger is received. A spring 35 coiled about the plunger and acting in compression between the enlargement 31 and the plug 33 constantly urges the plunger toward the serrating die a distance determined by the position of an inturned flange 36. The plunger is thus adapted for a limited degree of axial movement relative to the sleeve 32 which in turn is slidable longitudinally of a bore 37 in the frame 21.

A spring 38 coiled about the sleeve 32 and acting in compression between a shoulder 39 and a cap 40 on the rear end of the plunger tends to retract the sleeve and plunger to the position shown in Fig. 1. A follower 41 on one end of a lever 42 pivoted at 43 bears against the cap 40, a roller 44 on the other end constituting the follower of a cam 45 fast on the main drive shaft 46 which is arranged to rotate in a counterclockwise direction. The cam is driven in synchronism with the tapping tool. This may be accomplished by connecting the main drive shaft and the shaft 24 together through the medium of appropriate gearing 47.

The operation of the mechanism above described is as follows assuming that the parts are positioned as shown in Fig. 1 and that the tapping tool and the curved rod are entirely filled with finished nuts. In the assumed position of the parts, the plunger 29 will be fully retracted, a nut blank positioned on the block 29, and the previous blank will have been partially threaded. As the follower roller 44 rides along the dwell surface 48, the threading operation continues, the nut being held against rotation by virtue of the engagement between its serrations and the mating serrations 15 on the sleeve 16.

When the cam surface 49 encounters the roller 44, the lever 42 is rocked in a direction to project the sleeve 32 toward the right as viewed in Fig. 1. In the initial part of this movement, the plunger 29 engages the lowermost nut blank 9 and presses the same against the die block 12 whereupon the spring 35 yields until the lost motion between the plunger and the sleeve has been taken up. In the continued movement, the sleeve and plunger will move as a unit, and the plunger will be actuated positively forcing the nut blank through the serrations 13 of the die, the positive movement being arrested slightly short of the position at which the nut blank effectually engages the cutting elements of the tool 14 which occurs after the nut serrations have passed the die serrations.

The position of the sleeve 32 remains fixed as the follower 44 rides along the cam surface 50 but the forward movement of the plunger continues under the action of the spring 35 yieldably forcing the serrated blank onto the end of the tapping tool. The arrangement is such that by the time the surface 50 passes by the follower 44 permitting retraction of the sleeve 32 under the action of the spring 38, the threading operation will have been started and a sufficient length of thread cut to insure proper advance of the nut by the rotating tool. During threading, the nut is held effectually against turning by virtue of the engagement between the external serrations on the nut and the internal serrations on the sleeve 16 which fit loosely in order to facilitate advance of the nut by the action of the rotating tool. The cycle is complete as the plunger 29 is retracted to the position shown where it remains during the next dwell period and while the threading is being completed so as to advance the finished nut out of interfering relation with respect to the blank advanced in the next forward stroke of the plunger.

It will be apparent from the foregoing that the present invention provides for serrating the periphery of a nut blank automatically as an incident of advance thereof into operative engagement with the tool by which the blank is threaded. The serrating and threading operations occur successively but in one continuous axial movement of the blank. In this way, both operations may be performed in one machine not materially more complicated in construction than the machine ordinarily used for threading alone thereby avoiding the necessity of rehandling and repositioning the blanks for the second operation. A high degree of accuracy and low cost of manufacture are thus obtained.

I claim as my invention:

1. A machine for cutting longitudinal serrations around the periphery of a nut blank and threading the internal bore thereof comprising, in combination, a stationary die member having a cylindrical recess serrated to correspond to the serrations to be formed, a plunger axially alined with said recess and adapted to enter one end of the latter, a sleeve supporting said plunger for a limited degree of relative axial movement, a spring acting between said sleeve and plunger and normally urging the latter toward said die member, means for feeding nut blanks one by one into a position between said die member and said plunger when the latter is retracted, means for moving said sleeve intermittently toward said die member to advance the sleeve relatively to said plunger until the lost motion therebetween has been taken up against the action of said spring and then to advance said sleeve and plunger as a unit whereby to force a nut blank positively into said die member a predetermined distance, and a rotating tapping tool disposed within said die member and adapted to enter said bore and actively engage said blank in the movement of the blank by said spring while said sleeve is dwelling in advanced position.

2. A machine for cutting longitudinal serrations around the periphery of a nut blank and threading the internal bore thereof comprising, in combination, a stationary die member having a cylindrical recess serrated to correspond to the serrations to be formed, a plunger axially alined with said recess and adapted to enter one end of the latter, a support for said plunger movable axially of said recess and having a lost motion connection with the plunger, yieldably acting means normally urging said plunger toward said die member, means for feeding nut blanks one by one into a position between said die member and said plunger when the latter is retracted, means for moving said support intermittently toward said die member to first advance the support relative to said plunger and then advance the support and plunger as a unit whereby to force a nut blank positively into said die member a predetermined distance, and a rotating tapping tool disposed within said die member and adapted to enter said bore and actively engage said blank in the movement of the blank by said spring while said support is dwelling in advanced position.

3. A machine for cutting longitudinal serrations around the periphery of a nut blank and threading the central recess therein comprising, in combination, a stationary die member having an internal bore serrated to correspond to the serrations to be formed, a sleeve at the rear end of said bore axially alined with said die member and having internal serrations interfitting loosely with the serrations on a nut blank forced through said die member, means for presenting nut blanks successively to the forward end of said die member, a plunger reciprocable axially of said die member to positively force successive blanks therethrough and then advance each blank yieldingly into said sleeve, a rotary tapping tool projecting into the rear end of said sleeve and adapted for cutting engagement with each blank during the yielding advance thereof, and means for rotating said tool and for actuating said plunger intermittently.

4. A machine for cutting longitudinal serrations around the periphery of a nut blank and threading the internal bore thereof comprising, in combination, power driven means operating intermittently to advance nut blanks one by one in a continuous axial movement along a predetermined path first positively and then yieldingly, a die operating during the positive advance to cut longitudinal serrations around the periphery of said blank, a threading tool adapted to enter said bore and effectually engage each blank in the yielding movement thereof, and means engaging the serrations on each blank during engagement with said threading tool to hold the blank against turning.

5. A machine for cutting longitudinal serrations around the periphery of a nut blank and threading the internal bore thereof comprising, in combination, power driven means operating intermittently to advance nut blanks one by one axially along a predetermined path, a tubular member having longitudinally extending internal serrations and acting on each nut blank in the initial part of said motion to cut longitudinal serrations around the periphery of the blank and in the latter part of said motion to engage said serrations and hold the blank against turning, and a rotary tapping tool operating in the latter part of said motion to thread said bore.

6. A machine for cutting longitudinal serrations around the periphery of a nut blank and threading the internal bore thereof comprising, in combination, a stationary die member having a recess serrated longitudinally to correspond to the serrations to be formed, a tapping tool disposed within said recess and spaced from the forward end thereof, means by which nut blanks may be projected successively into the forward end of said recess to form said serrations and then forced yieldingly into engagement with said tool, and means for rotating said tool and for operating said last mentioned means intermittently in timed relation to the tool rotation.

7. A machine for cutting longitudinal serrations around the periphery of a nut blank and threading the internal bore thereof comprising, in combination, a stationary die member having an internal bore serrated longitudinally to correspond to the serrations to be formed, a tapping tool disposed within said bore and spaced from the forward end thereof, means by which nut blanks may be projected successively through said die to form said serrations and then into engagement with said tool, and means for rotating said tool and for operating said last mentioned means in timed relation.

8. A machine for cutting longitudinal serrations around the periphery of a nut blank and threading the internal bore thereof comprising, in combination, power driven means operating intermittently to advance nut blanks one by one in a continuous axial movement along a predetermined path, and means operating during the advance of each blank to cut longitudinal serrations around the periphery thereof and then thread said bore.

9. A machine for operating upon nut blanks comprising, in combination, power driven means operating intermittently to advance nut blanks one by one in a continuous axial movement along a predetermined path, and means operating during the advance of each blank to cut longitudinal serrations around the periphery thereof and perform a metal-removing operation on the central portion of the blank.

DAVID E. JOHNSON.